(12) United States Patent
Venugopal et al.

(10) Patent No.: US 10,240,462 B2
(45) Date of Patent: Mar. 26, 2019

(54) END WALL CONTOUR FOR AN AXIAL FLOW TURBINE STAGE

(71) Applicant: General Electric Company, Schenectady, NY (US)

(72) Inventors: Prem Venugopal, Clifton Park, NY (US); Alexander Stein, Simpsonville, SC (US); Shourya Prakash Otta, Clifton Park, NY (US); Ambady Suresh, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 507 days.

(21) Appl. No.: 15/010,145

(22) Filed: Jan. 29, 2016

(65) Prior Publication Data

US 2017/0218769 A1    Aug. 3, 2017

(51) Int. Cl.
*F01D 5/14* (2006.01)

(52) U.S. Cl.
CPC ............ *F01D 5/145* (2013.01); *F01D 5/143* (2013.01); *F05D 2220/32* (2013.01); *F05D 2240/24* (2013.01); *F05D 2240/81* (2013.01); *F05D 2250/711* (2013.01); *F05D 2250/712* (2013.01); *Y02T 50/673* (2013.01)

(58) Field of Classification Search
CPC .................................. F01D 5/143; F01D 5/145
See application file for complete search history.

(56) References Cited

U.S. PATENT DOCUMENTS

| 4,135,857 A | 1/1979 | Pannone et al. |
|---|---|---|
| 6,017,186 A | 1/2000 | Hoeger et al. |

(Continued)

FOREIGN PATENT DOCUMENTS

| EP | 1 239 116 A2 | 9/2002 |
|---|---|---|
| EP | 1 688 586 A1 | 8/2006 |
| WO | 2014/099102 A2 | 6/2014 |

OTHER PUBLICATIONS

Popović, Ivan, and Howard P. Hodson. "Aerothermal Impact of the Interaction Between Hub Leakage and Mainstream Flows in Highly-Loaded High Pressure Turbine Blades." J. Turbomach. Journal of Turbomachinery 135.6 (2013).

(Continued)

*Primary Examiner* — Woody A Lee, Jr.
(74) *Attorney, Agent, or Firm* — GE Global Patent Operation; John Darling (57) ABSTRACT

A turbine stage includes a row of airfoils joined to corresponding platforms to define flow passages therebetween. Each airfoil includes opposite pressure and suction sides and extends in chord between opposite leading and trailing edges. Each platform has a contoured flow surface including a purge valley, an elevated bulge and a bowl. The purge valley has a maximum depth at an elevation equal to or greater than a nominal axisymmetric platform surface of the corresponding platform. The purge valley extending tangentially against a purge cavity wall and into the blend area and extending axially from proximate the leading edge of a first airfoil toward the suction side of the first airfoil, and toward the leading edge of a second adjacent airfoil to channel a purge flow. The elevated bulge adjoins the pressure side aft of the leading edge and the bowl adjoins the suction side aft of the leading edge.

20 Claims, 5 Drawing Sheets

(56) References Cited

U.S. PATENT DOCUMENTS

| | | |
|---|---|---|
| 6,524,070 B1 | 2/2003 | Carter |
| 6,561,761 B1 | 5/2003 | Decker et al. |
| 7,134,842 B2 | 11/2006 | Tam et al. |
| 7,278,827 B2 | 10/2007 | Boury et al. |
| 8,105,037 B2 | 1/2012 | Grover et al. |
| 8,356,975 B2 | 1/2013 | Grover et al. |
| 9,085,985 B2 | 7/2015 | Barr et al. |
| 9,103,213 B2 | 8/2015 | Barr et al. |
| 2007/0081898 A1* | 4/2007 | Matsuda ............ F01D 5/145 416/193 A |
| 2011/0044818 A1* | 2/2011 | Kuhne ............... F01D 5/143 416/212 A |
| 2011/0243749 A1 | 10/2011 | Praisner et al. |
| 2013/0004331 A1* | 1/2013 | Beeck ................ F01D 5/143 416/97 R |
| 2015/0107265 A1 | 4/2015 | Smith et al. |
| 2015/0204196 A1 | 7/2015 | Miyoshi et al. |
| 2017/0089203 A1* | 3/2017 | Lohaus ............... F01D 5/143 |

OTHER PUBLICATIONS

Extended European Search Report and Opinion issued in connection with corresponding EP Application No. 17152710.4 dated Jul. 19, 2017.

\* cited by examiner

END WALL CONTOUR FOR AN AXIAL FLOW TURBINE STAGE

BACKGROUND

The present disclosure relates generally to gas turbine engines, any turbomachinery, and, more specifically, to turbines therein.

In a gas turbine engine air is pressurized in a compressor and mixed with fuel in a combustor for generating hot combustion gases. Turbine stages extract energy from the combustion gases to power the compressor, while also powering an upstream fan in a turbofan aircraft engine application, or powering an external drive shaft for marine and industrial applications.

In aviation applications, a high pressure turbine (HPT) immediately follows the combustor and includes a stationary turbine nozzle which discharges combustion gases into a row of rotating first stage turbine rotor blades extending radially outwardly from a supporting rotor disk. The HPT may include one or more stages of rotor blades and corresponding turbine nozzles. Following the HPT is a low pressure turbine (LPT) which typically includes multiple stages of rotor blades and corresponding turbine nozzles. In alternate applications, such as land based gas turbines for power generation, embodiments may employ a single shaft turbine, with or without a low pressure turbine (LPT).

Each turbine nozzle includes a row of stator vanes having radially outer and inner endwalls in the form of arcuate bands which support the vanes. Correspondingly, the turbine rotor blades include airfoils integrally joined to radially inner endwalls or platforms supported in turn by corresponding dovetails which provide mounting of the individual blades in dovetail slots formed in the perimeter of the supporting rotor disk. An annular shroud surrounds the radially outer tips of the rotor airfoils in each turbine stage.

The stator vanes and rotor blades have corresponding airfoils including generally concave pressure sides and generally convex suction sides extending axially in chord between opposite leading and trailing edges. Adjacent vanes and adjacent blades form corresponding flow passages therebetween bound by the radially inner and outer endwalls.

During operation, combustion gases are discharged from the combustor and flow axially downstream as a core flow through the respective flow passages defined between the stator vanes and rotor blades. In addition, purge air from a purge cavity existing upstream of the airfoil leading edge is discharged as a purge flow that prevents ingesting hot core flow below the main gas path and potentially provides a cooling effect to the platforms and airfoils. The aerodynamic contours of the vanes and blades, and corresponding flow passages therebetween, are precisely configured for maximizing energy extraction from the combustion gases which in turn rotate the rotor from which the blades extend.

The complex three-dimensional (3D) configuration of the vane and blade airfoils is tailored for maximizing efficiency of operation, and varies radially in span along the airfoils as well as axially along the chords of the airfoils between the leading and trailing edges. Accordingly, the velocity and pressure distributions of the combustion gases and purge air over the airfoil surfaces, as well as within the corresponding flow passages, also vary.

Undesirable pressure losses in the combustion gas flow-paths therefore correspond with undesirable reduction in turbine aerodynamics and overall turbine efficiency. For example, the combustion gases enter the corresponding rows of vanes and blades in the flow passages therebetween and are necessarily split at the respective leading edges of the airfoils. In addition, mixing of the purge air flow and the core flow may lead to turbine inefficiency.

The locus of stagnation points of the incident combustion gases extends along the leading edge of each airfoil, and corresponding boundary layers are formed along the pressure and suction sides of each airfoil, as well as along each radially outer and inner endwall which collectively bound the four sides of each flow passage. In the boundary layers, the local velocity of the combustion gases varies from zero along the endwalls and airfoil surfaces to the unrestrained velocity in the combustion gases where the boundary layers terminate.

Turbine losses can occur from a variety of sources, for example, secondary flows, shock loss mechanism and mixing losses. One common source of turbine pressure losses is the formation of horseshoe vortices generated as the combustion gases are split in their travel around the airfoil leading edges. A total pressure gradient is affected in the boundary layer flow at the junction of the leading edge and endwalls of the airfoil. This pressure gradient at the airfoil leading edges forms a pair of counterrotating horseshoe vortices which travel downstream on the opposite sides of each airfoil near the endwall. The two vortices travel aft along the opposite pressure and suction sides of each airfoil and behave differently due to the different pressure and velocity distributions therealong. For example, computational analysis indicates that the suction side vortex migrates away from the endwall toward the airfoil trailing edge and then interacts following the airfoil trailing edge with the pressure side vortex flowing aft thereto.

The interaction of the pressure and suction side vortices occurs near the midspan region of the airfoils and creates total pressure loss and a corresponding reduction in turbine efficiency. These vortices also create turbulence and increase undesirable heating of the endwalls.

Since the horseshoe vortices are formed at the junctions of turbine rotor blades and their integral root platforms, as well at the junctions of nozzle stator vanes and their outer and inner bands, corresponding losses in turbine efficiency are created, as well as additional heating of the corresponding endwall components.

Similarly, cross-passage pressure gradients between the pressure and suction side of the blade give rise to secondary flow structures and vortices that alter the desired aerodynamics of the blade, giving rise to losses in turbine efficiency as well as possible heating of the endwalls and even the blade.

At the leading edges of the turbine blades, and more particularly at a junction of the leading edge and the leading edge purge cavity, secondary flow structures and mixing of a purge flow from the leading edge purge cavity, results in mixing losses. In addition, the secondary flow structures result in mixing of the purge flow with the main core flow, resulting in a trajectory of the purge flow that is remote from the platform. These secondary flow structures result in high heat concentrations in the area where the turbine blade join the blade endwall structure.

Accordingly, it is desired to provide an improved turbine stage for reducing horseshoe and secondary flow vortex affects, as well as increasing aerodynamic loading while controlling heat distribution and efficiency, or improving efficiency and thermal loading, while maintaining aerodynamic loading and/or torque production.

BRIEF DESCRIPTION

In accordance with one exemplary embodiment, disclosed is a turbine stage. The turbine stage including a row of airfoils integrally joined to corresponding platforms and spaced laterally apart to define respective flow passages therebetween for channeling gases, each flow passage having a width. Each of the airfoils including a concave pressure side and a laterally opposite convex suction side extending in chord between opposite leading and trailing edges. At least some of the platforms having a contoured flow surface including a purge valley having maximum depth at an elevation equal or greater than a nominal axisymmetric platform surface of the corresponding platform. The purge valley extending tangentially against a purge cavity wall and into a blend area and extending axially from proximate the leading edge of a first airfoil toward the suction side of the first airfoil, and toward the leading edge of a second adjacent airfoil to channel a purge flow.

In accordance with another exemplary embodiment, disclosed is a turbine stage. The turbine stage including a row of airfoils integrally joined to corresponding platforms and spaced laterally apart to define respective flow passages therebetween for channeling gases, each flow passage having a defined width. Each of the airfoils including a concave pressure side and a laterally opposite convex suction side extending in chord between opposite leading and trailing edges. At least some of the platforms having a contoured flow surface including a purge valley, an elevated bulge and a bowl. The purge valley having maximum depth at an elevation equal or greater than a nominal axisymmetric platform surface of the corresponding platform. The purge valley extending tangentially against a purge cavity wall and into a blend area. The elevated bulge adjoining the pressure side aft of the leading edge of the respective airfoils. The bowl having a maximum depth lower than a nominal axisymmetric platform surface of the corresponding platform. The howl adjoining the purge valley, the elevated bulge and the suction side aft of the leading edge of the respective airfoils. The purge valley extending axially from proximate the leading edge of a first airfoil toward the suction side of the first airfoil and laterally toward the leading edge of a second adjacent airfoil to channel a purge flow.

In accordance with yet another exemplary embodiment, disclosed is a turbine blade. The turbine blade including an airfoil integrally joined to a platform, and having laterally opposite pressure and suction sides extending in chord between axially opposite leading and trailing edges. The platform including a purge valley extending tangentially into a blend area of the platform and having maximum depth at an elevation equal or greater than a nominal axisymmetric platform surface of the platform. The purge valley extending axially from proximate the leading edge of a first airfoil toward the suction side of the first airfoil, and toward the leading edge of a second adjacent airfoil to channel a purge flow.

Other objects and advantages of the present disclosure will become apparent upon reading the following detailed description and the appended claims with reference to the accompanying drawings. These and other features and improvements of the present application will become apparent to one of ordinary skill in the art upon review of the following detailed description when taken in conjunction with the several drawings and the appended claims.

DRAWINGS

The above and other features, aspects, and advantages of the present disclosure will become better understood when the following detailed description is read with reference to the accompanying drawings in which like characters represent like parts throughout the drawings, wherein.

DETAILED DESCRIPTION

Figure 1:
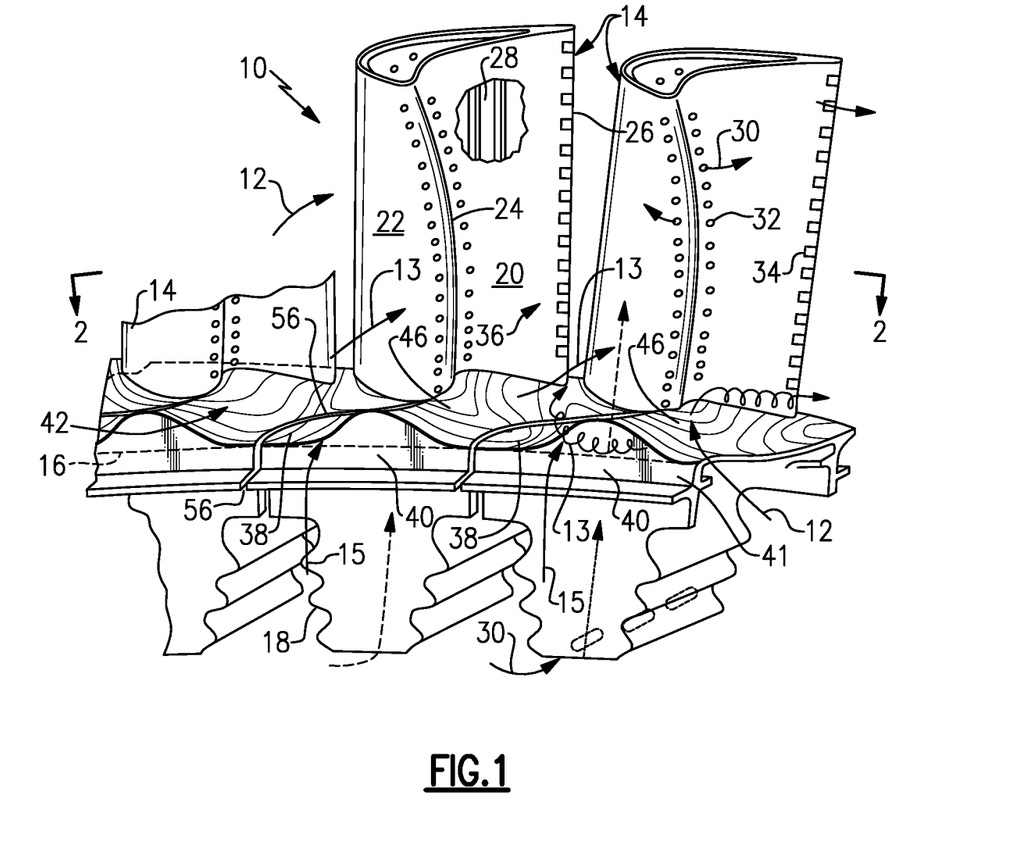
FIG. 1 is a forward-facing-aft elevational view of exemplary turbine blades in a turbine stage row according to an embodiment.

Referring to the drawings wherein identical reference numerals denote the same elements throughout the various views, illustrated in FIG. 1 are two exemplary first stage turbine rotor blades 10 which circumferentially adjoin each other in a full row thereof in a corresponding turbine stage of a gas turbine engine. As indicated above, combustion gases 12 are formed in a conventional combustor (not shown) and discharged in the axial downstream direction through the row of turbine blades 10 as a core flow 13. The turbine blades 10 extract energy from the combustion gases 12 for powering a supporting rotor disk (not shown) on which the blades 10 are mounted.

The turbine stage includes a complete row of the blades 10, with each blade 10 having a corresponding airfoil 14 integrally joined at a root end to a corresponding radially inner endwall or platform 16. Each platform 16 is in turn integrally joined to a corresponding axial-entry dovetail 18 conventionally configured for supporting the corresponding turbine blade 10 in the perimeter of the rotor disk.

Each airfoil 14 includes a generally concave pressure side 20 and a circumferentially or laterally opposite, generally convex suction side 22 extending axially in chord between opposite leading and trailing edges 24, 26, respectively. The two edges 24, 26 extend radially in span from root to tip of the airfoil 14.

Figure 2:
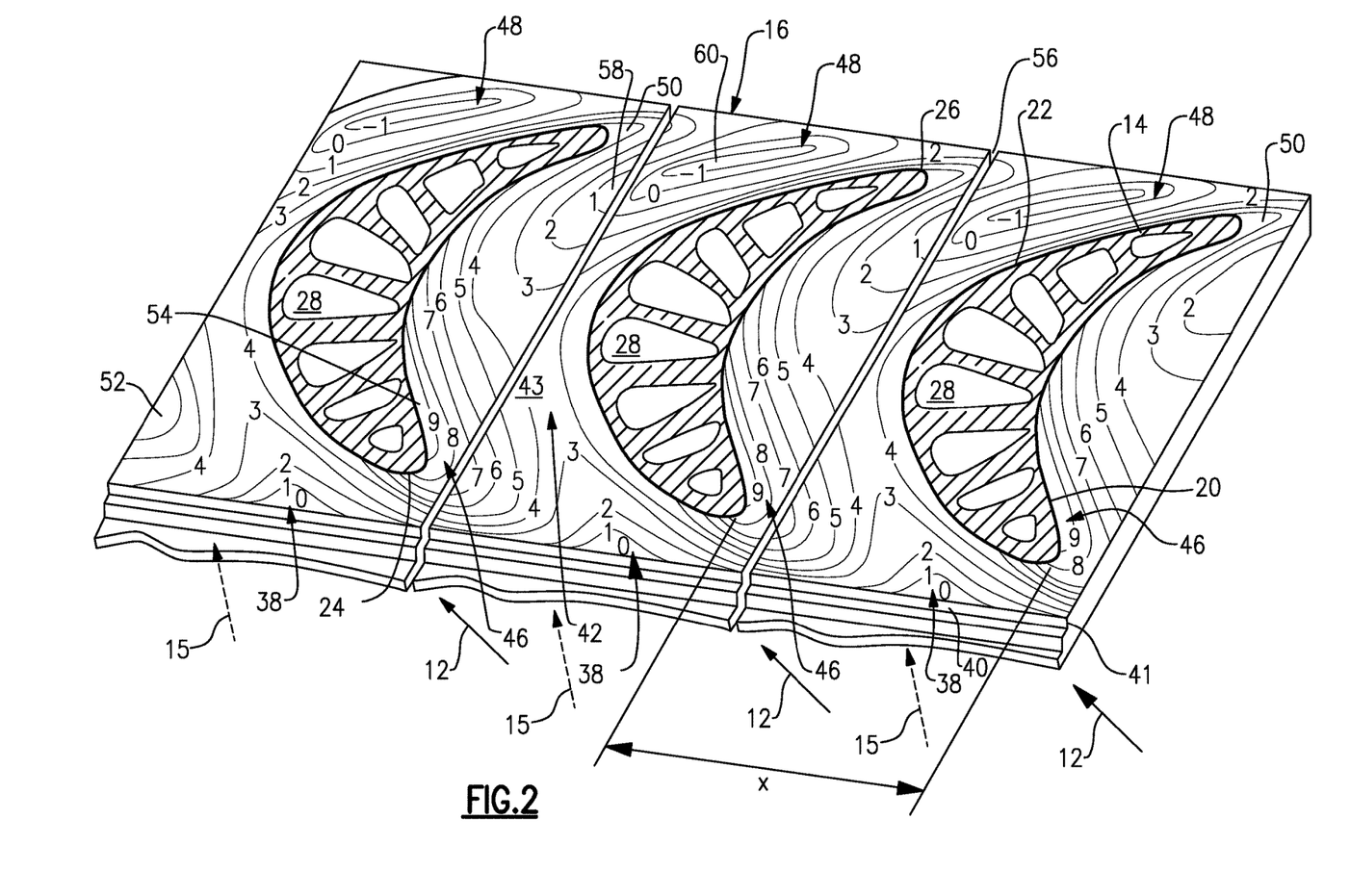
FIG. 2 is a planiform sectional view through the blades illustrated in FIG. 1 and taken along line 2-2 of FIG. 1 according to an embodiment.

As shown in FIGS. 1 and 2, each airfoil 14 may be hollow and include an internal cooling circuit 28 bound by the opposite pressure and suction sides 20, 22. The cooling circuit 28 may have any conventional configuration and includes inlet channels extending through the platform 16 and dovetail 18 for receiving cooling air 30 bled from the compressor of the engine (not shown).

The cooling air 30 is typically discharged from each airfoil 14 through several rows of film cooling holes 32 located where desired on the pressure and suction sides 20, 22 of the airfoil 14, and typically concentrated near the leading edge 24 thereof. Each airfoil 14 typically also includes a row of trailing edge cooling holes 34 which emerge through the pressure side 20 of the airfoil 14 just before the thin trailing edge 26 thereof.

The exemplary turbine blades 10 illustrated in FIGS. 1 and 2 may have any conventional configuration of the airfoil 14, platform 16 and dovetail 18 for extracting energy from the combustion gases 12 during operation. As indicated above, the platform 16 is integrally joined to the root end of the airfoil 14 and defines the radially inner flow boundary for the combustion gases 12, or the core flow 13.

The blades 10 are mounted in a row around the perimeter of the rotor disk, with the adjacent airfoils 14 being spaced circumferentially or laterally apart to define therebetween the inter-airfoil flow passage 36 having a passage width "x" defined between adjacent leading edges 24 (as best illustrated in FIG. 2) for channeling the combustion gases 12 and a purge flow 15 of purge air from a purge flow cavity (not shown) axially in the downstream direction during operation.

Each inter-airfoil flow passage 36 in the turbine stage illustrated in FIGS. 1 and 2 is therefore defined and bounded by the pressure side 20 of one airfoil 14, the suction side 22 of the next adjacent airfoil 14, the corresponding pressure and suction side portions 20, 22 of the adjacent platforms 16, and the radially outer turbine shroud (not shown) which surrounds the radially outer tip ends of the airfoils 14 in the complete row of turbine blades 10.

As indicated above in the Background section, the combustion gases 12 flow through the corresponding inter-airfoil flow passage 36 as the core flow 13 during operation and are necessarily split by the individual airfoils 14. The high velocity combustion gases are circumferentially split at the corresponding airfoil leading edges 24 with a stagnation pressure threat, and with the formation of corresponding boundary layers along the opposite pressure and suction sides 20, 22 of the airfoil 14. Furthermore, the combustion gases 12 also form a boundary layer along the individual blade platforms 16 as the gases are split around the airfoil leading edge 24 at its juncture with the platform 16.

In addition, the purge air flows from the purge flow cavity existing upstream of the airfoils 14 through the corresponding flow passage 36 as the purge flow 15. Minimizing an ejection of the purge flow 15 as a percentage of the core flow 13 leads to an increase of the static pressure downstream of the airfoil 14. This effect contributes to move the trailing edge 26 shock upstream, thus decreasing the trailing edge loss in the airfoils 14.

The split core flow 13 along the blade platforms 16 results in a pair of counterrotating horseshoe vortices which flow axially downstream through the inter-airfoil flow passage 36 along the opposite pressure and suction sides 20, 22 of each airfoil 14. These horseshoe vortices create turbulence in the boundary layers, and migrate radially outwardly toward the mid-span regions of the airfoils 14 and create losses of total pressure and reduce turbine efficiency. The horseshoe vortices are energized by the presence of a purge cavity and purge flow 15 which modify the cross-passage static pressure gradient.

The exemplary turbine rotor stage illustrated in FIG. 1 may have any conventional configuration such as that specifically designed as a first stage HPT rotor for extracting energy from the combustion gases 12 to power the compressor in a typical manner. As illustrated, the incident combustion gases 12 are split along the airfoil leading edges 24 to flow axially through the corresponding flow passages 36 as the core flow 13 in the downstream direction while the incident purge air flows across a shoulder area, or blend area, 40 of the platforms 16, wherein the blend area 40 is defined as the radius between a purge cavity wall 41 and the platform 16 surface. The purge air flows and mixes with the core flow 13 to flow axially through the corresponding inter-airfoil flow passage 36 as the purge flow 15 in the downstream direction.

The concave profile of the pressure sides 20 and the convex profile of the suction sides 22 are specifically configured for effecting different velocity and pressure distributions for maximizing extraction of energy from the combustion gases 12. The platforms 16 define radially inner endwalls which bound the combustion gases 12, with the gases also being bound radially outwardly by a surrounding turbine shroud (not shown).

In the illustrated configuration, the incident combustion gases 12 at the junction of the platforms 16 and leading edges 24 are subject to the horseshoe vortices, fueled by modifying of the cross-passage static pressure gradient by the purge flow 15. The combustion gases 12 progress through the inter-airfoil flow passage 36 along the opposite pressure 20 and suction sides 22 of the airfoils 14. As indicated above, these vortices create turbulence, decrease the aerodynamic efficiency of the turbine stage, and increase the heat transfer heating of the platforms 16.

Accordingly, the platforms 16 illustrated initially in FIG. 1 are specifically configured with contoured flow surfaces that minimize mixing of the purge flow 15 with the core flow 13 to minimize losses and bound the combustion gases 12 to reduce the strength of the horseshoe vortices. An exemplary configuration of the contoured platforms 16 is shown generally in FIG. 1 with isoclines of common elevation from a nominally axisymmetric platform. FIG. 2 illustrates in more detail the isoclines of FIG. 1 in planiform view.

Referring more specifically to FIGS. 1 and 2, modern computational fluid dynamics have been used to study and define the specific 3D contours of the platforms 16 for weakening the horseshoe vortices and minimizing mixing of the purge flow 15 with the core flow 13 and ingestion into the purge cavity, as well as altering the blade pressure field near the platform 16 to control the purge flow trajectory, while correspondingly improving turbine aerodynamic efficiency. The contoured platforms 16 illustrated in FIGS. 1 and 2 include a purge valley 38 configured to extend into the blend area 40 and having maximum depth that is at an elevation equal or greater than (+) a nominal axisymmetric platform surface of a conventional platform that defines the reference zero (0) surface, so as to form a depression or valley residing at or above the surface of the platform 16 that modifies the blend area 40. More particularly, the purge valley 38 is defined as having a radius at or above the axi-symmetric platform 16.

In the illustrated embodiment, the purge valley 38 is formed tangentially in the blend area 40 having a maximum depth location approximately midway the passage 36 width "x", between the leading edges 24 of adjacent airfoils 14. In an embodiment, the purge valley 38 may extend in a lateral direction approximately 60% the passage 38 width "x". In an alternate embodiment, the purge valley 38 may be formed tangentially in the blend area 40 and having a maximum depth location anywhere between 0% to 60% of the passage 36 width "x" between the leading edges 24 of adjacent airfoils 14, wherein such measurement is measured commencing from the leading edge 24 of a first airfoil 14 toward the suction side 22 of the first airfoil 14 and extending toward the leading edge 24 of a second adjacent airfoil 14 at the pressure side 20. In yet another embodiment, the purge valley 38 may be formed substantially tangentially in the blend area 40 and having a maximum depth location anywhere between −10% to 60% of the passage 36 width "x" between the leading edges 24 of adjacent airfoils 14 as previously described, and located at a position axially downstream of the leading edges 24 and within the inter-airfoil flow passage 36 formed there between. As previously stated, the purge valley 38 is configured having a maximum depth that resides at, or above, the surface of the platform 16. The purge valley 38 disclosed herein does not extend into the platform 16, so as to have a negative elevation, and maintains a radius at or above the axi-symmetric platform 16.

The purge valley 38 is configured to modify the blend area 40 of the airfoil 14 to ease the purge flow 15 into the core flow 13. More specifically, the purge valley 38 is configured to maintain a trajectory of the purge flow 15 closer to the platform 16 on the suction side 22 to minimize a subsequent downwash of the hot core flow 13 on the pressure side 20 of the airfoil 14 to backfill with fluid. The purge valley 38 and the purge flow 15 serve to modify the cross passage static pressure gradient which energizes the horseshoe vortices. The presence of the purge valley 38 provides for altering of the blade pressure field near the platform so as to control the purge flow trajectory. More particularly, the purge valley 38, and more specifically the overall end wall contour design disclosed herein, alters the pressure field such that ingress locations of the core flow 13 are moved to either side of the blade leading edge 24, allowing the purge flow 15 to enter the flow passages 36 there between. The purge flow 15 is thus more evenly distributed between the pressure and suction sides 20, 22 near the leading edges 24 so as to decrease the platform 16 temperature at that location.

Additionally, the presence of the purge valley 38 allows for the manipulation of the operational thermal profile at the leading edge 24 of the airfoil 14. This is because the modification in the purge flow 15 can change or cause a reduction of convective mixing and/or heat transfer which can normally bring the core flow 13 in contact with the endwalls. This aspect of the present disclosure allows for manipulation of the thermal profile via the reduction in mixing of the purge flow 15 with the core flow 13. Thus, a desired thermal distribution can be attained and can be optimized, resulting in a reduction of the cooling required.

In an embodiment, the purge valley 38 is defined by a pressure side bump or bulge 46, rising upwardly (+) relative to the nominal axisymmetric reference surface (θ) from the inter-airfoil flow passage 36 to the airfoil 14 pressure side 22. The pressure side bump or bulge 46 having a maximum radius near the airfoil leading edge 24 and a minimum radius that is also above the axi-symmetric platform 16 and allows for blending into the purge valley 38, in addition, a suction side depression or bowl 48, having a maximum radius, or depth, at an elevation (−) below the nominal axisymmetric platform surface (θ) and forming a depression or valley, extends from about mid-chord of the airfoil 14 to the trailing edge 26 near the midline of the flow passage 36. The suction side depression or bowl 48 is defined as having a radius below the axi-symmetric platform 16. The suction side depression or bowl 48 is configured to blend into the pressure side bump or bulge 46 and the purge valley 38.

It is noted that the specific sizes and spacing of the airfoils 14 are selected for a particular engine design and mass flow rate therethrough. The arcuate sidewalls of the airfoils 14 typically define the inter-airfoil flow passage 36 circumferentially therebetween that converges in the axial downstream direction from the leading edges 24 to the trailing edges 26.

The trailing edge 26 of one airfoil 14 typically forms a throat of minimum flow area along its perpendicular intersection near the midchord of the suction side 22 of an adjacent airfoil 14. The flow area of the flow passage 36, including the minimum flow area of the throat thereof, are preselected for a given engine application and therefore are controlled by both the radially inner endwall defined by platform 16, as well as the radially outer endwalls defined by the turbine shroud (not illustrated).

The reference platform surface may be conveniently defined as the conventional axisymmetrical surface defined by circular arcs around the circumference of the turbine stage, and may be used as the zero reference elevation illustrated in FIG. 2. In an embodiment the purge valley 38 and the bulge 46, rise outwardly in elevation (+) from the zero reference plane (θ) or surface of the platform 16. The purge valley 38 having a maximum depth at or above the reference plane or surface of the platform 16 so as to form a depression or valley geometry, relative to the bulge 46. The bowl 48 has a maximum depth lower than the reference plane (θ) or surface of the platform 16 so as to form a depression or valley geometry, relative to the bulge 46. In this way, the valley 38, bulge 46 and bowl 48 may complement and offset each other for maintaining the desired or given flow area for each inter-airfoil flow passage 36.

The purge valleys 38, bulges 46 and bowls 48 illustrated in FIGS. 1 and 2 are preferentially located specifically for reducing the strength of the horseshoe vortices, minimizing losses due to secondary flows, minimizing mixing of the purge flow 15 from a leading edge purge cavity with the main core flow 13, minimizing the ingestion of the hot core flow 13 into the purge cavity, and modifying the cross passage static pressure gradient which energizes the horseshoe vortexes, all improving turbine aerodynamic efficiency. In the illustrated embodiment, the purge valley 38 is configured at a position upstream and proximate the leading edge 24 at the suction side 22, near the midline of the inter-airfoil flow passage 36 and formed to extend onto the shoulder, or blend area 40, of the platform 16. As used herein, the blend area 40 is intended to encompass approximately 10% of the platform blade chord. The bulge 46 is configured to directly adjoin the airfoil pressure side 20 at a position downstream, or aft, of the leading edge 24. The bowl 48 is configured proximate the airfoil suction side 22, aft and blending with the bulge 46 and the purge valley 38.

By using the purge valley 38, the purge flow 15 is eased into the core flow 13, with the trajectory of the purge flow 15 maintained closer to the platform 16 as it lifts off the platform 16 on the suction side 22. This minimizes a subsequent downwash of hot core flow 13 on the pressure side 20. The result is a less mixed fluid flow exiting the inter-airfoil flow passage 36. More particularly, by altering the pressure field such that the ingress locations are moved to either side of the blade leading edge 24, the purge flow 15 is allowed to enter a main gas path in between. The purge flow 15 is thus evenly distributed between the pressure and suction sides 20, 22 near the leading edge 24, thereby lowering the temperature of the platform 16 at that location.

By incorporating the leading edge bulge 46, the bowl 48, and the purge valley 38 in a single embodiment, the incoming horseshoe vortices can be offset by local streamline curvature of the combustion gases 12 around the bulge 46. Correspondingly, the radially outward migration of the horseshoe vortices can be interrupted early in the inter-airfoil flow passage 36 by the bowl 48.

As previously eluded to, the purge valley 38 is effective for changing the local stagnation point at the root of the airfoil, guiding the purge flow 15 into the core flow 13 thereby controlling the amount of mixing that occurs, as well as controlling the trajectory of the purge flow 15 and its subsequent merging with the suction side leg of the horseshoe vortex.

The bulge 46 and the bowl 48 are effective for reducing flow acceleration of the combustion gases 12, increasing local static pressure, altering gradients in gas pressure, reducing vortex stretching, and reducing reorientation of the horseshoe vortices as they travel downstream through the inter-airfoil flow passages 36. These combined effects limit the ability of the horseshoe vortices to migrate radially outwardly along the airfoil suction side 22, and reduce the vortex strength and in turn increasing overall efficiency of the turbine stage.

Figure 3:
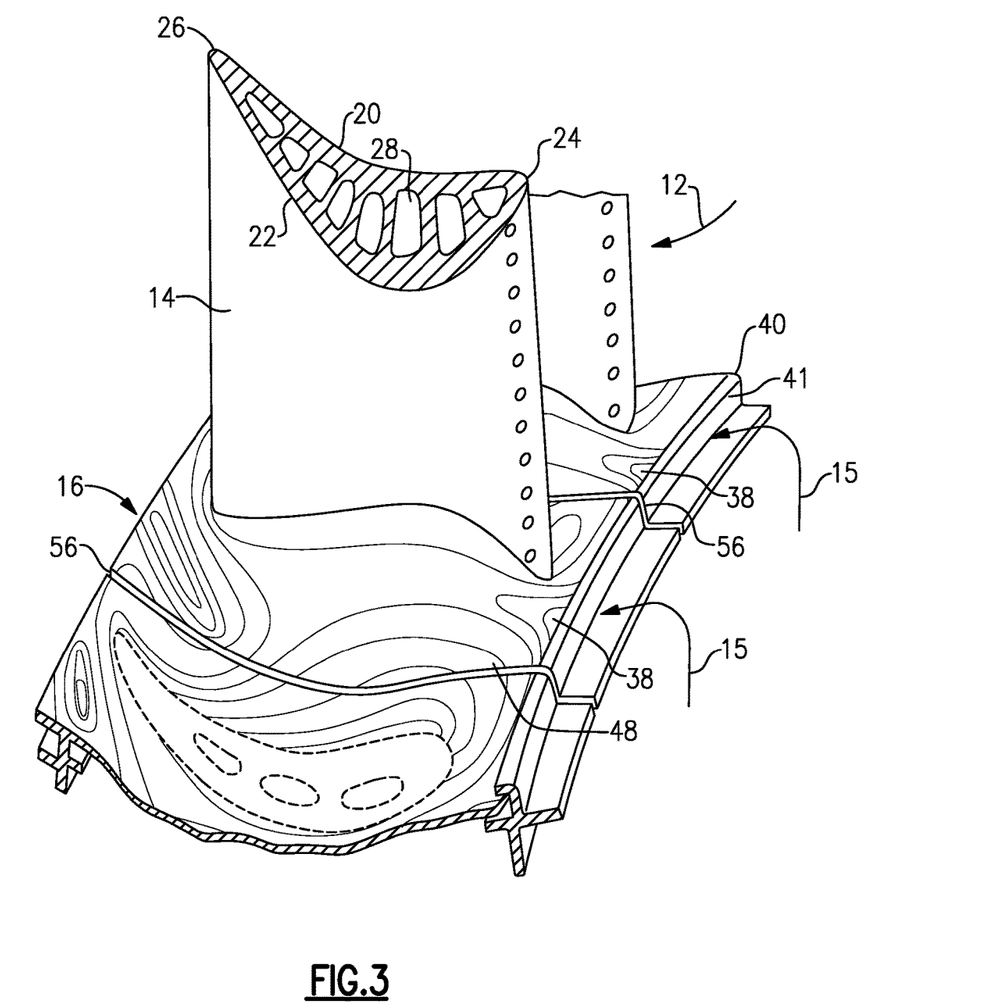
FIG. 3 is a isometric view of the suction side of the blades illustrated in FIG. 1 according to an embodiment.

As indicated above, FIG. 2 is a planiform view of the platforms 16 with isoclines of equal elevation relative to the reference zero surface (θ). FIG. 3 illustrates the platforms 16 in isometric view with superimposed surface gradient lines to emphasize the 3D varying contour of the platforms 16 between the forward and aft ends of each platform 16 and circumferentially or laterally between adjacent airfoils 14.

Since the platforms 16 extend on both sides of each airfoil 14, typically with small extensions forward of the leading edge 24 and aft of the trailing edge 26, the purge valley 38, the elevated bulge 46 and the depressed bowl 48 will smoothly transition with each other in a preferred manner to minimize mixing of the purge flow 15 and reduce the strength of the horseshoe vortices. Preferably, the bulge 46 decreases in height or elevation as it extends aft and laterally along the pressure side 20 to join the bowl 48 along the suction side 22. The bulge 46 further decreases in height or elevation as it extends forward and laterally toward the purge valley 38. The purge valley 38 extends into the blend area 40 of the platform 16 toward the purge cavity. The bowl 48 extends along the suction side 22 between the leading and trailing edges 24, 26, commencing, for example, mid-chord and blending with the purge valley 38 and the elevated bulge 46 and terminating toward the trailing edge 26.

Figure 4:
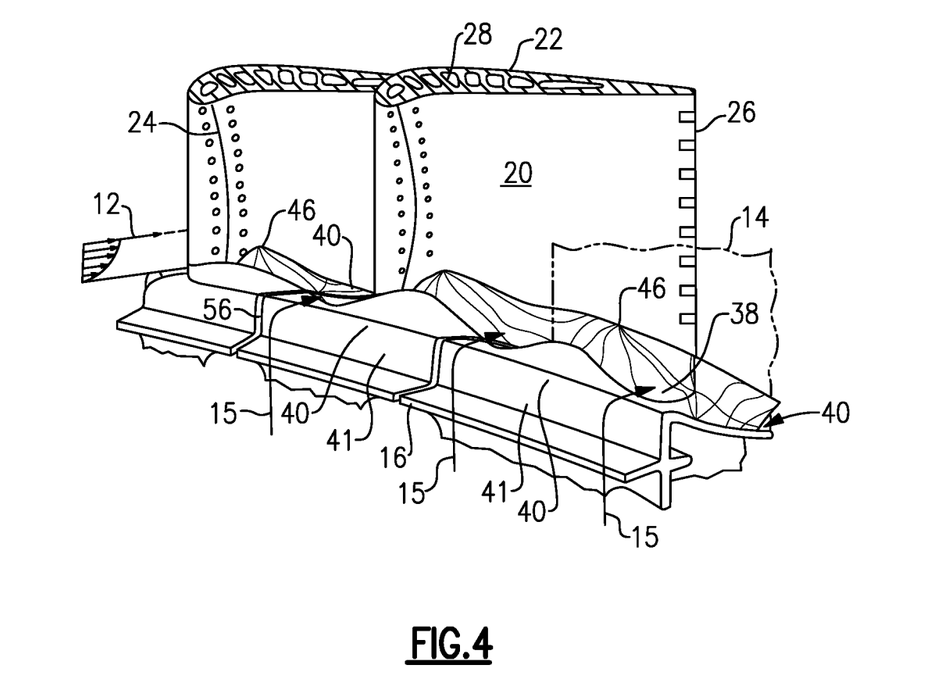
FIG. 4 is an isometric view of the pressure side of the blades illustrated in FIG. 1 according to an embodiment.

FIGS. 2-4 best illustrate that the purge valley 38 is configured laterally off-centered with maximum depth at the suction side 22 forward the leading edge 24, and at an elevation at or above the surface of the platform 16, so as to extend into the blend area 40 of the platform 16. The purge valley 38 further blends into the bulge 46 aft of the leading edge 24.

FIGS. 2 and 4 best illustrate that the bulge 46 is centered with maximum height at the pressure side 20 of the airfoil 14, aft of the leading edge 24, and decreasing in height aft of the leading edge 24, and towards the trailing edge 26 and decreasing in height so as to blend into the purge valley 38 forward the leading edge 24, as well as laterally or circumferentially from the pressure side 20 of one airfoil 14 toward the suction side 22 of the next adjacent airfoil 14.

Figure 5:
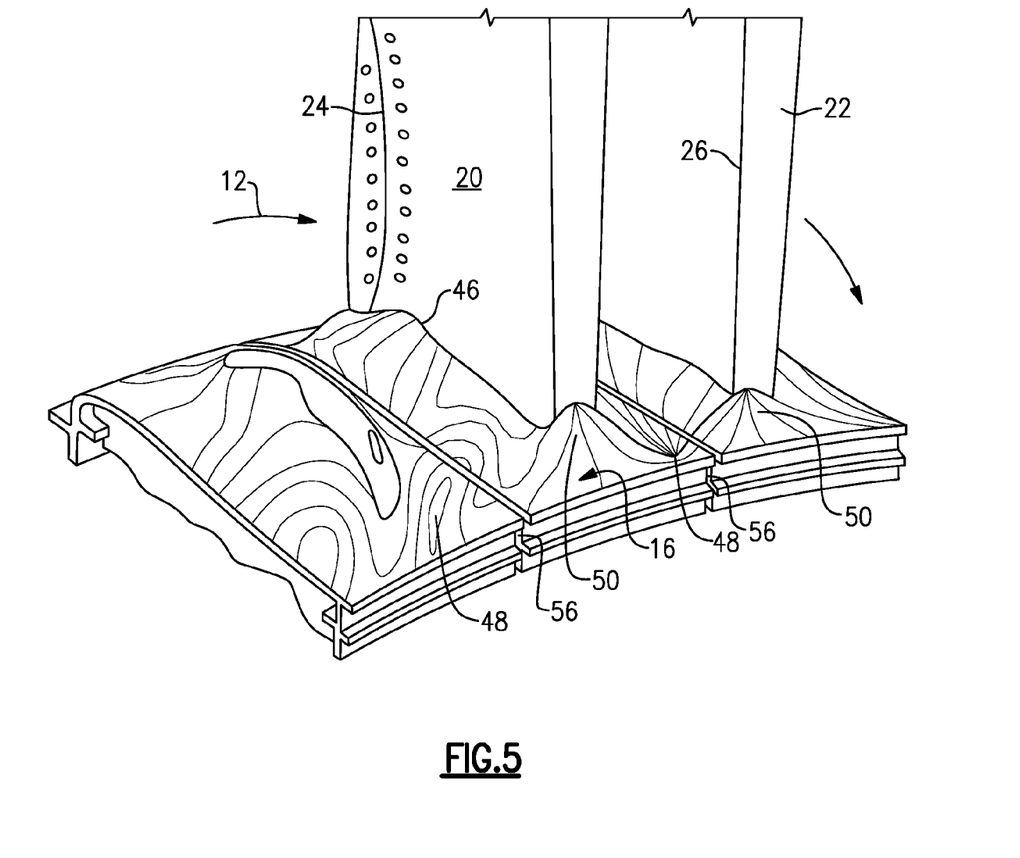
FIG. 5 is an isometric view aft-facing-forward of the blades illustrated in FIG. 1 according to an embodiment.

FIGS. 2 and 5 best illustrate that the bowl 48 is centered with maximum depth at the suction side 22 and extending from a mid-chord, or hump region, and blends aft of the leading edge 24 into the bulge 46 and the purge valley 38, while decreasing in depth towards the trailing edge 26, as well as laterally or circumferentially from the suction side 22 of one airfoil 14 towards the pressure side 20 of the next adjacent airfoil 14.

FIG. 4 illustrates schematically the incident combustion gases 12 which have a corresponding boundary layer in which the velocity of the combustion gases 12 is zero directly at the flow surface of the platform 16 and increases rapidly to the freestream velocity. The thickness of the boundary layer ranges from about two percent to about 15 percent of the radial height or span of the airfoil 14. In addition, illustrated is the incident purge flow 15 upon the purge valley 38. The magnitude of the platform scalloping, encompassing the purge valley 38, and the bulge 46 and bowl 48, can be relatively small to specifically minimize losses due to secondary flows, minimize mixing of the purge flow 15 with the core flow 13 and reduce the strength of the horseshoe vortices to increase turbine aerodynamic efficiency.

The purge valley 38 as shown in FIGS. 2 and 4 has a maximum depth which may scale with the purge flow level. The bulge 46 as shown in FIGS. 2 and 4 has a maximum height which is generally equal to the thickness of the incoming boundary layer of combustion gases 12 as they are first channeled over the platforms 16. Correspondingly, the bowl 48 has a maximum depth less than about the maximum height of the bulge 46. In FIG. 2, the isoclines have been labeled with arbitrary numbers from the reference zero surface (θ), with the bulge 46 increasing in height to an exemplary magnitude of about +9, with the bowl 48 increasing in height from a maximum depth lower than (below) the reference zero surface (θ), and more particularly decreasing in height to an exemplary magnitude of approximately −1 relative to the reference zero surface (θ), and the purge valley 38 blending with the bulge 46 and onto the blend area 40 of the platform 16 having a maximum depth slightly above or at the reference zero surface (θ) and having an exemplary magnitude of about +3.

These exemplary numbers are merely representative of the changing contour of the contoured platform 16. The actual magnitudes of the purge valley 38, the bulge 46 and the bowl 48 will be determined for each particular design. In an embodiment, a maximum depth of the purge valley 38 ranges from approximately 0 to 40 mils. In an embodiment, a maximum depth of the bowl 48 ranges from approximately −20 to about −140 mils. In an embodiment, a maximum height of the bulge 46 ranges from approximately 120 mils (0.12 inch) to about 1200 mils (1.2 inch). In an embodiment, the turbine airfoils range in height from 2 inches to about 15 inches.

FIGS. 2 and 4 also illustrate that the purge valley 38 resides generally tangentially against the purge cavity, and more particularly in the blend area 40 of the platform 16, and generally concave laterally from its origin of maximum depth at or slightly above the surface of the platform 16, which is positioned directly in and extending across the blend area 40 of the platform 16 between the leading edge 24 and the suction side 22 of the airfoil 14. The purge valley 38 extends aft toward the trailing edge 26 to blend or transition smoothly into the bulge 46 and the bowl 48. The bulge 46 is resides generally against the pressure side 20 of the airfoil 14, and generally convex both forwardly toward the leading edge 24 and in the aft direction towards the trailing edge 26. In the axial plane extending circumferentially between the leading edges 24 of the airfoil row, the bulges 46 are conical in section between the convex forward and aft portions thereof in the exemplary embodiment illustrated in FIG. 4 for which computational flow analysis predicts a significant reduction in vortex strength and migration. The exemplary bowl 48 illustrated in FIGS. 2 and 5 is generally concave laterally from its origin of maximum depth at an elevation lower the surface of the platform 16. The bowl 48 is positioned directly on the suction side of each airfoil 14 commencing approximately mid-chord and blending with the bulge 46 and the purge valley 38. The bowl 48, like the bulge 46, is resides generally centering on the airfoil suction side 22.

FIGS. 2 and 4 illustrate the transition between the purge valley 38 and the bowl 48 on the airfoil suction side 22, and the elevated bulge 46 on the airfoil pressure side 20. More specifically, the bulge 46 configured aft of the leading edge 24 on the pressure side 20, decreases gradually, along the longer extent of the pressure side 20 to the trailing edge 26. The gradual transition of the bulge 46 to the trailing edge 26 forms a ridge extension of the bulge 46 that decreases in elevation.

Correspondingly, the purge valley 38 increase in depth gradually toward the leading edge 24 of the airfoil 14 and onto the blend area 40 to form an inlet for the purge flow 15. The purge valley 38 blends with the elevated bulge 46 and the depressed bowl 48 gradually along the longer extent of the suction side 22 aft to the trailing edge 26 as best illustrated in FIGS. 2 and 3.

FIGS. 2 and 5 illustrate that purge valley 38 blends into the bowl 48 from its peak height which decreases in along the suction side 22 and extends toward the trailing edge 26. The bulge 46 decreases continuously in height along the pressure side 20 from its peak height aft of the leading edge 24 to the trailing edge 26. Both the bulge 46 and bowl 48 blend together around the trailing edge 26 and terminate laterally or circumferentially in the corresponding inter-airfoil flow passages 36 between the trailing edges 26 at the zero reference elevation.

FIGS. 2 and 4 illustrate that the purge valleys 38, beginning or commencing preferably forward of the leading edges 24 and transitioning into the bulges 46 and the bowls 48 beginning or commencing preferably aft of the leading edges 24, to form or define laterally therebetween an axially arcuate flute or channel 42 along the elevation contour therebetween. The fluted channel 42 extends axially along the individual platform 16 between adjacent airfoils 14 commencing forward of the leading edges 24 and terminating at the trailing edges 26, or aft thereof as desired within the available surface space of the platforms 16. As best illustrated in FIG. 2, the fluted channel 42 has elevation contours at an elevation above the zero reference surface of the platform 16, and bordered by the higher elevation bulge 46 and adjacent airfoil 14.

The fluted channel 42 elevation contours may be a single line, or a land 43 of a suitable width defined between the bulge 46, the bowl 48 and the purge valley 38. In the land embodiment, the convex bulge 46 preferably blends with one side of the land through an inflection region having a convex transition with the land. The purge valley 38 and concave bowl 48 preferably blend with the other portions of the land through another inflection region having a concave transition with the land.

In addition to the purge valley 38, the bulge 46, and the bowl 48, a trailing edge ridge 50 is configured at the trailing edge 26 of the airfoils 14, as best illustrated in FIGS. 2, 3, and 5. Similar to the bulge 46 discussed previously, the trailing edge ridge 50 is a bulged or contoured platform which rises upwardly (+) into the flow passage 36 from the platforms 16 which define the radially inner endwalls. In the illustrated embodiment, the trailing edge ridge 50 is shown coupled with the bowl 48. The present disclosure is not limited in this regard as the combination of contoured surfaces employed are selected for particular operational and design parameters, such as mass flow rate, etc.

Similar to the discussion regarding the bulge 46, the trailing edge ridge 50 rises into the inter-airfoil flow passage 36. As shown by the contour lines adjacent the trailing edge 26, in FIG. 2, the slope of the trailing edge ridge 50 is steeper than that of the bulge 46. However, in other exemplary embodiments the slope can be similar to, or less than, that of the bulge 46.

Further, in an exemplary embodiment, the structure of the trailing edge ridge 50 closest to the trailing edge 26 has the steepest slope, whereas as the distance from the trailing edge 26, along the platform 16, increases the slope decreases and becomes more gradual, thus providing a more gradual and smooth transition to the platform 16 surface.

The trailing edge ridge 50 further modifies the loading of the airfoil 14 near the endwall. This modification can result in increased lift, an alteration of the horseshoe and secondary flow structures, a change in the shock structures and accompanying losses, as well as a modification of the heat transfer.

By blending the trailing edge ridge 50 into the trailing edge 26 of the airfoil 14 and the platform 16, an increase in the aerodynamic efficiency of the airfoil 14, and thus turbine as a whole, can be achieved. Namely, the trailing edge ridge 50 can act to increase the area for aerodynamic loading of the airfoil forming the airfoil 14. By adding to the area that can support loading, the operational performance of the turbine can be increased, resulting in more work being extracted from the turbine. Stated differently, the trailing edge ridge 50, acts to extend the camber line of the airfoil 14 near the endwall. Thus, additional loading beyond the trailing edge 26 can be supported. The aerodynamic effect of this additional loading acts as an overcambering of the airfoil 14, where endwall loading is reduced near mid-passage of the airfoil 14 but is increased near the trailing edge 26. Thus, near endwall velocities are slower, overturning is enhanced and the primary turbine flow shifts toward the mid-span section. The result of this effective overcamber is a reduction in skin friction and secondary flow. Thus, an overcambering effective is achieved in the turbine without modifying the entire airfoil 14.

Additionally, the trailing edge ridge 50 allows for the manipulation of the operational thermal profile at the trailing edge 26 of the airfoil 14. This is because the modification in secondary flow (discussed above) can change or cause a reduction of convective mixing and/or heat transfer which can normally bring the hot core flow 13 in contact with the endwalls. The trailing edge 26 of the airfoil 14 can be the location of high temperature concentrations, thus limiting structural performance of the blade 10 and the endwall at the trailing edge 26. The trailing edge ridge 40 allows for manipulation of the thermal profile. The trailing edge ridge 50 provides for a desired thermal distribution to be attained and optimized, resulting in a reduction of the cooling required.

The shape and contour of the trailing cadge ridge 50 in conjunction with the purge valley 38, the bulges 46 and the bowls 48, is determined to optimize performance of the airfoils 14 and the turbine. For example, the shape of the trailing edge ridge 50 is optimized either for aerodynamic performance or durability or both, depending on the desired performance parameters and characteristics.

As shown in FIGS. 2, 4 and 5 the trailing edge ridge 50 directly adjoins the trailing edge 26 of the airfoil 14. Further, in the embodiment shown in these figures, the trailing edge ridge 50 adjoins both the airfoil suction side 22 and the pressure side 20. In another embodiment, the trailing edge ridge 50 adjoins and extends from the trailing edge 26 as shown and adjoins only one of the pressure side 20 or the suction side 22, depending on design and operational parameters. In a further alternative embodiment, the trailing edge ridge 50 adjoins and extends from the trailing edge 26 as shown but does not adjoin either of the pressure side 20 or the suction side 22.

In a further exemplary embodiment, an additional bowl and/or bulge (not shown) may be positioned on the surface 16 at some point downstream of the trailing edge ridge 50. In such an embodiment, the bowl and/or bulge can aid in vortex suppression or otherwise optimizing the operational and performance parameters of various embodiments of the present disclosure.

The maximum height (i.e., positive (+) displacement above platform 16) of the trailing edge ridge 50 is at the trailing edge 26, and the height of the trailing edge ridge 50 reduces as the trailing edge ridge 50 extends away from the airfoil 14 surfaces. The trailing edge ridge 50 smoothly transitions into the bowl 48 so as to affect efficient structural and thermal load distribution. The trailing edge ridge 50 smoothly transitions to the purge valley 28, the bulge 46 and the bowl 48 for design and performance purposes.

In an embodiment, the maximum height of the trailing edge ridge 50 may match that of the bulge 46, which has a maximum height which is generally equal to the thickness of the incoming boundary layer of combustion gases 12 (see discussion previously). However, it is contemplated that based on varying operational parameters the height of the trailing edge ridge 50 can be higher than, or lower than, the height of the bulge 46.

In an exemplary embodiment, the orientation of the trailing edge ridge 50 is such that it follows the mean camber line for the airfoil shape. However, the present embodiment is not limited in this regarding as the orientation and overall shape of the trailing edge ridge 50 and its contour is to be optimized such that the desired operational and performance parameters are achieved. It is well within the ability of a skilled artisan to perform such optimization.

Since the exemplary turbine stage illustrated in the Figures is configured as a turbine rotor stage, the individual platforms 16 are integrally joined to the root of each airfoil 14, with a corresponding dovetail 18 (FIG. 1) there below, with the platforms 16 collectively defining the radially inner boundary or endwalls for the combustion gas flow 12. Each platform 16 therefore adjoins an adjacent platform at an axial splitline 56, with the splitlines 56 bifurcating or splitting the inter-airfoil bulges 46 axially between the leading edges 24 of adjacent airfoils 14 in complementary first bulge portions 52 and second bulge portions 54. Similarly, the inter-airfoil bowls 48 are split axially between the trailing edges 26 in complementary first bowl portions 58 and second bowl portions 60. This is best illustrated in FIG. 2 in which the platform 16 has portions extending from the opposite pressure and suction sides 20, 22 of the airfoil 14. The bulges 46 are disposed primarily on the pressure side 20 of the platform 16. The bowls 48 are is disposed primarily on the suction side 22 of the platform 16.

However, the first bulge portion 52 is interrupted by the axial splitline 56 from the complementary second bulge portion 54 integrally formed with the purge valley 38 on the next adjacent platform 16. The first bulge portion 52 on one platform 16 is complementary with the second bulge portion 54 on the next adjacent platform 16 and collectively define a single complete bulge 46 that blends purge valley 38 and bowl 48.

The axial splitlines 56 interrupt the circumferential continuity of the entire turbine row stage, and permit the individual fabrication of each turbine blade in a conventional manner, such as by casting. The overall configuration of the turbine blade including its airfoil 14, platform 16 and dovetail 18 may be cast in a conventional manner, and the contoured features thereof may also be integrally cast therein where feasible.

Alternatively, the platforms 16 may be cast with nominal axisymmetric platforms with locally elevated material for the purge valley 38, the bulge 46, and bowl 48, which may then be machined using conventional electrical discharge machining (EDM) or electrochemical machining (ECM) for forming the 3D contour of the contoured platform 16.

A significant feature of the contoured platforms 16 illustrated in FIGS. 2 and 4 is the purge valley 38 provided extending into the blend area 40 of the purge cavity and extending aft to blend with a decreasing aspect of the bulge 46 of the adjacent airfoil 14 toward the suction side 22 of the airfoil and a decreasing aspect of the bowl 48. Preferably each purge valley 38 is configured extending laterally between the leading edges 24 of adjacent airfoils 14, and more particularly between the leading edge 24 and suction side 22 of the airfoil. The purge valleys 38 rapidly blend with the corresponding bulge 46 that extends over the large majority of the pressure side 20 and the bowl 48 that extends over the large majority of the suction side 22.

The purge valleys 38 provide a decrease in mixing of the purge flow 15 and the core flow 13, thereby minimizing a subsequent downwash of the core flow 13 on the pressure side 20 to backfill with fluid and weaken the formation of horseshoe vortices at their inception. The purge valleys 38 further modify the cross-passage static pressure gradient that provides energy to the horseshoe vortices. The elevated bulge 46, configured directly aft of the leading edge 24, provides additional weakening of the horseshoe vortices. Preferably each bulge 46 extends in most part from aft of the leading edge 24 and in an aft direction along the pressure side 20 to the trailing edge 26.

The contour of each airfoil 14, and twist or angular position thereof, are selected for each design application so that the leading edge 24 of the airfoil 14 first receives the combustion gases 12, typically at an oblique angle from the axial centerline axis, and the purge flow 15, keeping it close to the platform 16 surface as it lifts off the platform 16 on the suction side 22. The combustion gases 12, as the core flow 13, and purge flow 15 turn as they flow through the curved inter-airfoil flow passages 36 between the airfoils 14. The natural stagnation point of the incoming combustion gases 12 may be aligned with the leading edge 24 itself or aligned closely adjacent thereto on either the pressure or suction sides 20, 22 of the airfoil 14.

Accordingly, for each particular design application, at least one of the purge valley 38 or the bulge 46 may be centered at the natural stagnation point proximate the leading edge region of the airfoil 14. The so positioned purge valley 38, bulge 46 and bowl 48 are specifically introduced in the radially inner platforms 16 of the turbine rotor blades 10 to cooperate with each other with synergy for reducing the mixing of the purge flow 15 with the core flow 13 and modifying the cross-passage static pressure gradient that drives the horseshoe vortices towards the airfoil suction side 22, thereby reducing the strength of the horseshoe vortices that stretch and wrap around the leading edge 24 and flow downstream through the inter-airfoil flow passage 36.

The combination of reduced losses due to secondary flows, vortex strength and altered pressure gradients reduce migration of the vortices towards the airfoil suction side 22, and reduce the tendency for the vortices to migrate along the airfoil 14 span for correspondingly reducing losses in turbine aerodynamic efficiency.

The contoured platforms have been disclosed above for a turbine rotor, but could also be applied to a turbine nozzle. In a turbine nozzle, turbine vanes are integrally mounted in radially outer and inner endwalls or bands which are typically axisymmetrical circular profiles around the centerline axis. Both the inner and outer bands may be contoured in a manner similar to that disclosed above for reducing the adverse effects of the corresponding secondary vortices generated at the opposite ends of the turbine nozzle vanes and increasing aerodynamic loading and efficiency while providing beneficial thermal distribution.

The contoured platform 16 may therefore be used for enhancing aerodynamic efficiency in any type of turbine engine, and for any type of turbine airfoil. Further examples include turbine rotor blisks in which the airfoils are integrally formed with the perimeter of the rotor disk. Low pressure turbine blades may include integral outer shrouds in which the contoured platform may also be introduced. Further, steam turbine blades and vanes may also include the contoured platforms at the corresponding root ends thereof. Additionally, various embodiments can be employed in other similar applications such as pumps, blowers, turbines and the like. Embodiments as disclosed herein are not limited in this regard.

Modern computer fluid dynamics analysis now permits the evaluation of various permutations of the contoured platforms 16 for minimizing mixing of a purge flow 15 and a core flow 13, while reducing vortices to increase turbine efficiency. The specific contours of the purge valleys 38, bulges 46, bowls 48 and trailing ridges 50 will vary as a function of the specific design. As previously described, the form of the purge valley 38 extends into the blend area 40 of the purge cavity and has a maximum depth that is at an elevation equal or greater than (+) a nominal axisymmetric platform surface of a conventional platform that defines the reference zero (θ) surface, so as to form a depression or valley residing at or above the surface of the platform 16. The purge valley 38 is defined as having a radius at or above the axi-symmetric platform 16. The purge valley 36, the elevated bulge 46 on the airfoil pressure side 20 at the leading edge 24, the bowl 48 and the trailing edge ridge 50 at the airfoil trailing edge 26 reduce the adverse effects of the mixing of the purge flow 15 with the core flow 13 and effects of vortices generated as the combustion gases 12 split over the airfoil leading edges 24, decreased aerodynamic loading and undesirable thermal distributions.

In various embodiments, the purge valleys 38, bulges 46, bowls 48 and trailing ridges 50 are blended with each other respectively and the airfoil 14 via fillet structures as described herein. For example, the purge valley 38 and the bulge 46 will be blended to each other, as well as the purge valley 38 and the bowl 48 being blended to each other with fillets while the trailing edge ridge 50 and the bowl 48 are blended with each other. It should be understood that the overall contours, blending and fillet structure can be optimized as needed.

While there have been described herein what are considered to be preferred and exemplary embodiments of the present disclosure, other modifications shall be apparent to those skilled in the art from the teachings herein, and it is, therefore, desired to be secured in the appended claims all such modifications as fall within the true spirit and scope of the disclosure.

The invention claimed is:

1. A turbine stage comprising:
    a row of airfoils integrally joined to corresponding platforms and spaced laterally apart to define respective flow passages therebetween for channeling gases, each flow passage having a width;
    each of the airfoils including a concave pressure side and a laterally opposite convex suction side extending in chord between opposite leading and trailing edges; and
    at least some of the platforms having a contoured flow surface including a purge valley having maximum depth at an elevation equal or greater than a nominal axisymmetric platform surface of the corresponding platform;
    an elevated bulge extending along a portion of the airfoils and coupled to the at least some platforms, the elevated bulge adjoining the pressure side of each respective airfoil and having a maximum elevation at the airfoil pressure side surface;
    an elevated region extending along a portion of the airfoils and coupled to the at least some platforms, the elevated region adjoining the suction side of each respective airfoil and having a maximum elevation at the airfoil suction side surface,
    the purge valley formed between the elevated bulge and the elevated region and extending tangentially against a purge cavity wall and into a blend area and extending axially from proximate the leading edge of a first airfoil toward the suction side of the first airfoil, and toward the leading edge of a second adjacent airfoil to channel a purge flow.

2. The turbine stage according to claim 1, wherein the purge valley is configured having a maximum depth laterally at a location −10% to 60% of the width of the flow passage formed between the leading edges of adjacent airfoils, wherein such measurement is measured commencing from the leading edge of the first airfoil extending laterally toward the convex suction side of the first airfoil and toward the leading edge of the second adjacent airfoil at the concave pressure side of the second adjacent airfoil.

3. The turbine stage according to claim 2, wherein the purge valley is configured having a maximum depth laterally at a location substantially midway between the leading edges of adjacent airfoils.

4. The turbine stage according to claim 1, wherein the purge valley is configured having a maximum depth axially at a location forward the leading edge of the airfoil.

5. The turbine stage according to claim 1, wherein at least some platforms further include:
    a bowl extending along a portion of the airfoils and coupled to the at least some platforms and having a maximum depth lower than a nominal axisymmetric platform surface of the corresponding platform, the bowl adjoining the purge valley, the elevated bulge and the suction side aft of the leading edge of each respective airfoil with the respective platforms,
    the purge valley, the elevated bulge, the elevated region and the bowl form an arcuate channel extending axially along the platform between adjacent airfoils.

6. The turbine stage according to claim 5, wherein at least some of the platforms include a trailing edge ridge structure extending along a portion of the airfoils and coupled to the at least some platforms, the trailing edge ridge structures adjoining at least one of the pressure side and the suction side at the trailing edge of each respective airfoil with the respective platforms.

7. The turbine stage according to claim 6, wherein each of the trailing edge ridge structures adjoins the pressure side, the suction side, and the trailing edge of each respective airfoil with the respective platforms.

8. The turbine stage according to claim 5, wherein the elevated bulge is centered at the pressure side aft of the leading edge, and decreases in height forward, aft, and laterally therefrom and the bowl is centered at the suction side commencing near the maximum thickness of the airfoils, and blends in a forward direction with the purge valley and the elevated bulge, and decreases in depth in an aft direction and laterally therefrom.

9. The turbine stage according to claim 5, wherein the elevated bulge decreases in height in a forward direction, aft of the leading edge and decreases to the trailing edge and blends with the purge valley near the leading edge and with the bowl near the trailing edge.

10. The turbine stage according to claim 5, wherein the purge valley is concave laterally, the elevated bulge is convex forward and aft and the bowl is concave laterally.

11. A turbine stage comprising:
a row of airfoils integrally joined to corresponding platforms and spaced laterally apart to define respective flow passages therebetween for channeling gases, each flow passage having a defined width;
each of the airfoils including a concave pressure side and a laterally opposite convex suction side extending in chord between opposite leading and trailing edges; and
at least some of the platforms having a contoured flow surface including a purge valley having maximum depth at an elevation equal or greater than a nominal axisymmetric platform surface of the corresponding platform, the purge valley extending tangentially against a purge cavity wall and into a blend area, an elevated bulge adjoining the pressure side aft of the leading edge of the respective airfoils and having a maximum elevation at the airfoil pressure side surface, an elevated region extending along a portion of the airfoils and coupled to the at least some platforms, the elevated region adjoining the suction side aft of the leading edge of each respective airfoil and having a maximum elevation at the airfoil suction side surface, and a bowl having a maximum depth lower than a nominal axisymmetric platform surface of the corresponding platform, the bowl adjoining the purge valley, the elevated bulge, the elevated region and the suction side aft of the leading edge of the respective airfoils,
the purge valley formed between the elevated bulge and the elevated region and extending axially from proximate the leading edge of a first airfoil toward the suction side of the first airfoil and laterally toward the leading edge of a second adjacent airfoil to channel a purge flow.

12. The turbine stage according to claim 11, wherein at least some platforms having a trailing edge ridge structure extending along a portion of the airfoils and coupled to the at least some platforms, the trailing edge ridge structures adjoining at least one of the pressure side and the suction side at the trailing edge of each respective airfoil with the respective platforms.

13. The turbine stage according to claim 11, wherein at least some platforms having a trailing edge ridge structure extending along a portion of the airfoils and coupled to the at least some platforms, the trailing edge ridge structures adjoining the pressure side and the suction side at the trailing edge of each respective airfoil with the respective platforms.

14. The turbine stage according to claim 11, wherein the purge valley is configured having a maximum depth laterally at a location −10% to 60% of the width of the passage formed between the leading edges of adjacent airfoils, wherein such measurement is measured commencing from the leading edge of the first airfoil extending laterally toward the convex suction side of the first airfoil and toward the leading edge of the second adjacent airfoil at the concave pressure side of the second adjacent airfoil.

15. The turbine stage according to claim 11, wherein the purge valley is configured having a maximum depth laterally at a location forward the leading edge of the airfoil.

16. The turbine stage according to claim 11, wherein the bulge is centered at the pressure side aft of the leading edge, and decreases in height forward, aft, and laterally therefrom and the bowl is centered at the suction side commencing near the maximum thickness of the airfoils and extending toward the trailing edge, and blends in a forward direction with the elevated bulge and the purge valley.

17. A turbine blade comprising:
an airfoil integrally joined to a platform, and having laterally opposite pressure and suction sides extending in chord between axially opposite leading and trailing edges;
the platform including a purge valley extending tangentially into a blend area of the platform and having maximum depth at an elevation equal or greater than a nominal axisymmetric platform surface of the platform;
an elevated bulge extending along a portion of the airfoils and coupled to the at least some platforms, the elevated bulge adjoining the pressure side of each respective airfoil and having a maximum elevation at the airfoil pressure side surface; and
an elevated region extending along a portion of the airfoils and coupled to the at least some platforms, the elevated region adjoining the suction side of each respective airfoil and having a maximum elevation at the airfoil suction side surface,
the purge valley formed between the elevated bulge and the elevated region and extending axially from proximate the leading edge of a first airfoil toward the suction side of the first airfoil, and toward the leading edge of a second adjacent airfoil to channel a purge flow.

18. The blade according to claim 17, further including a bowl adjoining the suction side aft of the leading edge and a trailing edge ridge adjoining at least one of the pressure side and the suction side at the trailing edge of the airfoil, the bowl having a maximum depth at an elevation lower than a nominal axisymmetric platform surface of the platform, wherein the elevated bulge and the bowl blend with the purge valley.

19. The blade according to claim 17, wherein the purge valley is configured having a maximum depth axially at a position axially upstream of the leading edge.

20. The blade according to claim 17, wherein the purge valley is configured having a maximum depth laterally at a location forward the leading edge of the airfoil.

* * * * *